United States Patent [19]
Chartrand

[11] Patent Number: 5,324,057
[45] Date of Patent: Jun. 28, 1994

[54] TWO-WHEEL DRIVE CYCLE

[76] Inventor: Francois Chartrand, 1009, Route 202, Godmanchester Huntingdon, R.R. 4), Quebec, Canada, J0S 1H0

[21] Appl. No.: 941,136

[22] PCT Filed: Mar. 6, 1992

[86] PCT No.: PCT/CA92/00099
§ 371 Date: Nov. 6, 1992
§ 102(e) Date: Nov. 6, 1992

[87] PCT Pub. No.: WO92/15478
PCT Pub. Date: Sep. 17, 1992

[30] Foreign Application Priority Data
Mar. 8, 1991 [CA] Canada .................................. 2037891

[51] Int. Cl.⁵ .............................................. B62M 1/02
[52] U.S. Cl. ..................................... 280/261; 280/230
[58] Field of Search ............... 280/230, 259, 261, 223, 280/234

[56] References Cited
U.S. PATENT DOCUMENTS

| | | |
|---|---|---|
| 564,009 | 7/1896 | Ehrhardt . |
| 1,149,422 | 8/1915 | Allen ................................ 280/230 |
| 3,045,772 | 7/1962 | Nicolai . |
| 3,193,305 | 7/1965 | Hendricks . |
| 3,823,959 | 7/1974 | Winters .............................. 280/234 |
| 3,921,467 | 11/1975 | Matsuura ........................ 280/261 X |
| 4,451,064 | 5/1984 | Perkins ................................ 280/259 |
| 4,479,660 | 10/1984 | Pattison .............................. 280/261 |
| 4,773,663 | 9/1988 | Sawyer et al. ..................... 280/261 |
| 4,895,385 | 1/1990 | Becoat ................................ 280/259 |
| 4,993,733 | 2/1991 | Eilers ................................... 280/261 |
| 5,158,314 | 10/1992 | Farras Pinos ................... 280/261 X |

FOREIGN PATENT DOCUMENTS

| | | |
|---|---|---|
| 3319105 | 11/1984 | Fed. Rep. of Germany . |
| 2523065 | 9/1983 | France . |
| 2579950 | 10/1986 | France . |
| 8809739 | 12/1988 | PCT Int'l Appl. . |
| 1450682 | 9/1976 | United Kingdom . |

OTHER PUBLICATIONS

Auron, Lary; "Snake: Le velo a deux roues motrices"; Velo Vert, Jan.-Feb. 1992, pp. 28-30.
WO,A,9 112 167 (Biannic) Aug. 1991.

Primary Examiner—Margaret A. Focarino
Assistant Examiner—C. Mattix
Attorney, Agent, or Firm—Cushman, Darby & Cushman

[57] ABSTRACT

A two-wheel drive cycle comprises a frame, a front fork assembly mounted on the frame through a pivotal connection to steer the cycle, a front wheel rotating on the fork assembly about a first axis, and a rear wheel rotating on the frame about a second axis. A front sprocket is mounted on the front wheel and centered on the first axis to drive the front wheel, while a rear sprocket is mounted on the rear wheel, is centered on the second axis and driven through the pedals or motor. A chain is meshed with both the front and rear sprockets and guided between these front and rear sprockets through a plurality of gears and pulleys, including a set of gear and pulley engaging the chain and rotatively mounted on the frame close to the pivotal connection. A spring mechanism lengthens and shortens the chain loop as the front fork assembly is turned. In operation, the front wheel is driven through the pedals or motor, the rear sprocket, the chain meshed with both the front and rear sprockets, and the front sprocket.

10 Claims, 3 Drawing Sheets

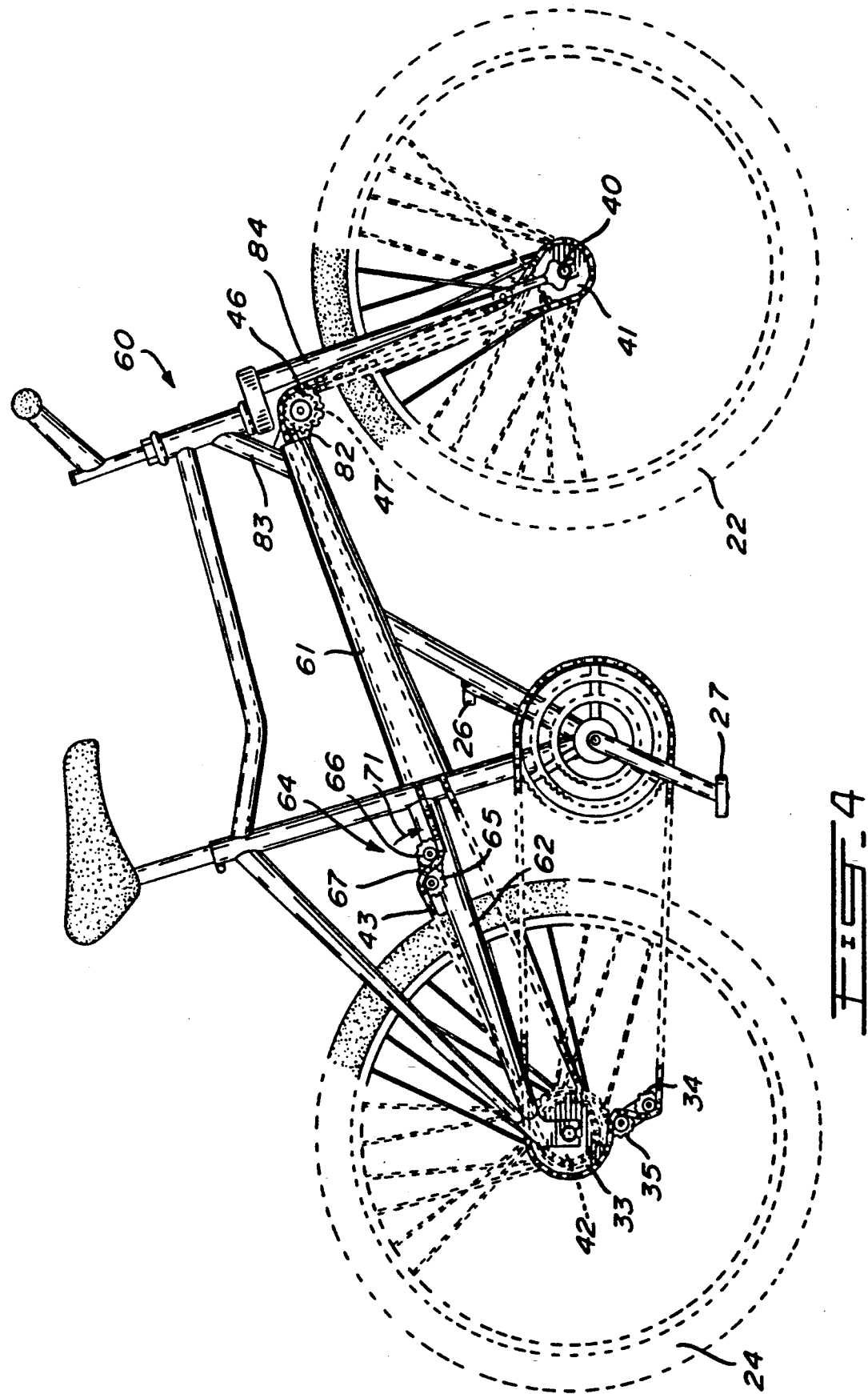

TWO-WHEEL DRIVE CYCLE

BACKGROUND OF THE INVENTION

1. Field of the Invention:

The present invention relates to a two-wheel drive cycle, i.e. a bicycle or motorcycle, comprising a power train capable of driving the front wheel substantially as efficiently as the rear wheel.

2. Brief Description of the Prior Art:

A prior art two-wheel drive bicycle is disclosed in International patent application published under number WO 91/12167 (Biannic et al.) on Aug. 22, 1991.

This bicycle comprises a rear wheel driven through the conventional pedals, cranks, chain wheel, chain and sprocket cluster. An additional sprocket is mounted on the rear wheel to drive the front wheel through first and second chains. The first chain is meshed with the additional sprocket of the rear wheel while the second chain is meshed with a sprocket mounted on the front wheel.

To enable easy steering of the front fork assembly, on which the front wheel rotates, the first and second chains are interconnected through a cardan joint mounted on the pivotal connection between the fork assembly and the frame of the bicycle, that is on the head tube of that frame.

The two-wheel drive bicycle of International patent application WO 91/12167 presents the following drawbacks:

the head tube of the frame as well as the fork assembly must be cast and/or machined to receive the cardan joint;

a cardan joint is complex and additional pieces such as bushings, needle bearings, etc. are required upon installation; it is therefore very expensive;

in the cardan joint used in International patent application WO 91/12167, the rotational speeds of the input and output shafts are different during two angular portions of each revolution;

the major disadvantage is that the different pieces of the cardan joint and those necessary to its installation withstand important stresses and therefore produce a lot of frictional losses; these losses obviously require an additional effort from the cyclist, which effort is not used to drive the bicycle; and all the pieces of the cardan joint requires specialized maintenance as well as frequent lubrication.

The present inventor has constructed a two-wheel drive bicycle using a cardan joint as disclosed in the aforementioned International patent application, and obtained poor results due to the above mentioned drawbacks related to the use of a cardan joint.

OBJECT OF THE INVENTION

An object of the present invention is therefore to overcome the above discussed drawbacks of the prior art by interconnecting the sprockets of the front and rear wheels directly through a single chain appropriately guided between the two sprockets.

SUMMARY OF THE INVENTION

In accordance with the present invention, there is provided a two-wheel drive cycle comprising a frame, a front fork assembly mounted on this frame through a pivotal connection to steer the cycle, a front wheel mounted on the fork assembly to rotate about a first axis, a rear wheel mounted on the frame to rotate about a second axis, a mechanism for driving the rear wheel, a front sprocket mounted on the front wheel and centered on the first axis to drive the front wheel, a rear sprocket mounted on the rear wheel, centered on the second axis, and driven through the driving mechanism, a chain forming a closed loop and meshed with both the front and rear sprockets, and means for guiding the chain between the front and rear sprockets, these chain guiding means comprising a set of grooved or toothed wheels engaging the chain and rotatively mounted on the cycle close to the pivotal connection.

In operation, the front wheel is driven through the driving mechanism, the rear sprocket driven by this mechanism, the chain meshed with both the front and rear sprockets, and the front sprocket driven through the chain.

In accordance with preferred embodiments of the present invention:

the chain guiding means comprises a spring mechanism for lengthening and shortening the chain loop as the front fork assembly is pivoted about the pivotal connection;

the front and rear sprockets are lying in respective planes, and the chain is flexible in these planes and laterally thereof;

the chain is twistable and the grooved or toothed wheels of said set are rotatively mounted on a single axle itself fixedly secured to the frame;

the chain is twistable and the grooved or toothed wheels of said set are rotatively mounted on respective, spaced apart axles fixedly secured to the frame;

the front wheel comprises a front hub rotating with the front wheel about the first axis, the front wheel is mounted on the fork assembly through the front hub, the front sprocket is mounted on the front hub, the rear wheel comprises a rear hub rotating with the rear wheel about the second axis, the rear wheel is mounted on the frame through the rear hub, and the rear sprocket is mounted on the rear hub; and the front and rear sprockets are mounted on the same side of the cycle, the pivotal connection comprises a head tube of the frame, and the grooved or toothed wheels of said set are mounted on the head tube on the same side of the bicycle as the front and rear sprockets.

In accordance with another aspect of the present invention, there is provided a two-wheel drive cycle comprising a frame, a front fork assembly mounted on the frame through a pivotal connection to steer the cycle, a front wheel comprising a central hub mounted on the fork assembly through a front free wheel to rotate about a first axis, a rear wheel comprising a central hub mounted on the frame through a rear free wheel to rotate about a second axis, a mechanism for driving the rear wheel through the rear free wheel, a front sprocket mounted on the front free wheel and centered on the first axis to drive this front wheel, a rear sprocket mounted on the rear free wheel and centered on the second axis, and therefore driven through the driving mechanism, a chain forming a closed loop and meshed with both the front and rear sprockets, and means for guiding the chain between the front and rear sprockets, these chain guiding means comprising a set of grooved or toothed wheels engaging the chain and rotatively mounted on the cycle in the proximity of the pivotal connection. In operation, the front wheel is driven through the driving mechanism, the rear free wheel driven by this mechanism, the rear sprocket mounted on the rear free wheel, the chain meshed with the rear sprocket, the front sprocket mounted on the front free wheel and meshed with the chain, and the front free wheel.

Since the front and rear sprockets are mounted on the front and rear free wheels, respectively, the latter cycle is advantageous in that the chain will stop to rotate when for example operation of the pedals is interrupted.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 4 is a right, side elevational view of a second embodiment of a two-wheel drive bicycle in accordance with the present invention;

DETAILED DESCRIPTION OF THE PREFERRED EMBODIMENTS

Figure 1:
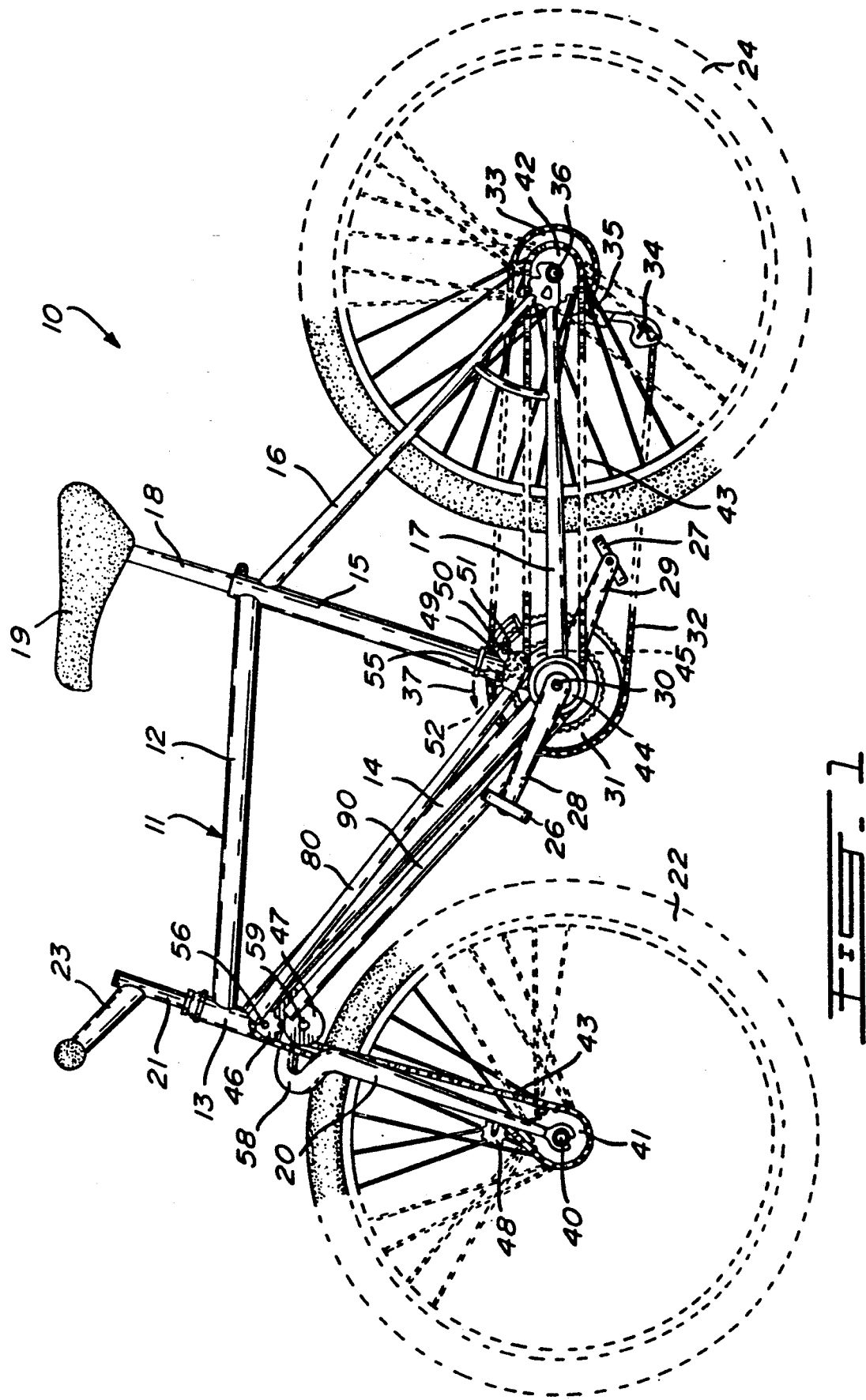
FIG. 1 is a left, side elevational view of a first embodiment of a two-wheel drive bicycle in accordance with the present invention.
Figure 2:
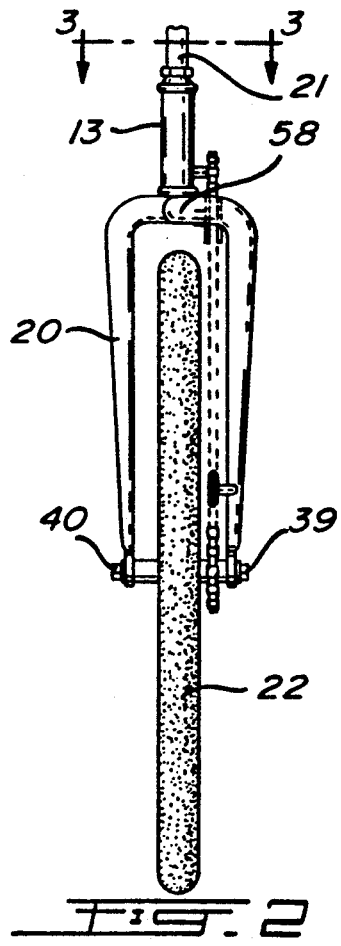
FIG. 2 is a front elevational view of the front wheel and fork of the two-wheel drive bicycle of FIG. 1.
Figure 3:
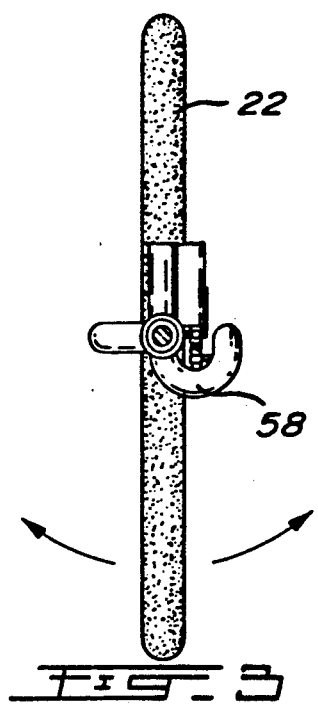
FIG. 3 is a top, cross sectional view of the front wheel and fork of the bicycle of FIG. 1, taken along line 3—3 of FIG. 2.

As illustrated in FIGS. 1-3 of the accompanying drawings, the first embodiment of the two-wheel drive bicycle, generally identified by the reference numeral 10 comprises a conventional frame 11 itself including a crossbar 12, a head tube 13, a down tube 14, a seat tube 15, seat stays such as 16, and chain stays such as 17. A seat post 18 is slidable into the seat tube 15, but can be fixed at a particular longitudinal position in that tube whereby the height of the saddle 19, fastened to the upper free end of the seat post 18, can be adjusted as required. Of course, an appropriate fastener (not shown) is provided to block the post 18 in the tube 15 when the saddle 19 reaches the desired position.

A front fork 20 comprises a stem 21 pivotally mounted in the head tube 13 through ball bearing. A front wheel 22 includes a central front hub (not shown) rotatively mounted on a front axle 40 through a well known free wheel (not shown). The threaded ends of the front axle 40 are mounted on the respective free ends of the two prongs of the front fork 20 through a pair of nuts such as 39. Handlebars 23 are fastened to the upper end of the stem 21 to allow the cyclist to steer the bicycle 10 by turning the fork 20 through the pivotal connection including the head tube 13 and the stem 21.

A rear wheel 24 is rotatively mounted between the intersection of the right seat and chain stays and the intersection of the left seat and chain stays. Conventionally, the rear wheel 24 is mounted on the frame 11 of the bicycle 10 through a hub (not shown) rotating on an axle 36 through a well known free wheel (not shown).

The bicycle is driven through a conventional power train including a pair of pedals 26 and 27, a pair of cranks 28 and 29, a bottom bracket axle 30, a set of laterally adjacent and coaxial chain wheels 31, a chain 32, a sprocket cluster 33, a tension roller 34 and a jockey roller 35. To drive the rear wheel 24, the pedals 26 and 27 are operated by the two feet of the cyclist to rotate the bottom bracket axle 30 in direction 37 through the two cranks 28 and 29. One of the chain wheels 31 mounted on the axle 30 is thereby rotated to drive the chain 32 meshed with the teeth of the chain wheel 31 and the teeth of one of the sprockets of the cluster 33, and engaging the tension and jockey rollers 34 and 35 of the rear derailleur. The sprocket cluster 33 is mounted on the free wheel (not shown) through which the hub of wheel 24 is mounted on the axle 36. Driving of the chain 32 therefore causes rotation of the sprocket cluster 33 to thereby drive the rear wheel 24 through the rear free wheel and hub. As known by those skilled in the art, the free wheel will allow the rear wheel 24 to keep rotating when operation of the pedals 26 and 27 and therefore driving of the chain 32 is interrupted by the cyclist.

The above described structure of the bicycle 10 is generally conventional and believed to be fully understandable by those skilled in the art. Accordingly, it will not be further elaborated in the present specification. Also, the mechanisms for moving the chain 32 from one sprocket of the cluster 33 to the other and for moving the chain 32 from one chain wheel 31 to the other and for moving the chain 32 from one chain wheel 31 to the other, as well as the brake mechanisms are well known to those skilled in the art and will not be described in this specification.

The mechanism used to drive the front wheel 22 will now be described.

On the side of the bicycle 10 opposite to the pair of chain wheels 31 and of the sprocket cluster 33, a front sprocket 41 is mounted on the front free wheel (not shown) to rotate about the front axle 40. On the same side of the bicycle 10, a rear sprocket 42 is mounted on the rear hub (not shown) to rotate with that hub about the rear axle 36. A chain 43, forming a closed loop, is meshed with both the front and rear sprockets 41 and 42. As will be described in further detail in the following description, the chain 32 is guided along the frame 11 of the bicycle 10 between the front and rear sprockets 41 and 42. Accordingly, as the rear wheel is driven, the rear hub is rotated and therefore drives the front wheel 22 through the rear sprocket 42, the chain 43, the front sprocket 41, and the front free wheel and hub. To drive the front 22 and rear 24 wheels at a same rotational speed, the diameters of the front and rear sprockets 41 and 42 are equal.

During a turn, the front wheel 22 will rotate at a speed higher than the rear wheel due to the larger radius of curvature. The installation of the front sprocket 41 on the front free wheel will therefore prevent transmission of the additional rotational movement to the front wheel 22 to the rear wheel 24 to thereby prevent skidding of the rear wheel.

To guide the chain 43 between the front and rear sprockets 41 and 42, toothed and/or grooved wheels 44-48 such as sprockets, pulleys or a combination thereof (hereinafter referred to as wheels), are used.

When the upper portion of the chain loop 43 leaves the rear sprocket 42, it is first guided by tension wheel 45. As shown in FIG. 1, tension wheel 45 is mounted on a bracket 49 welded to the rear face of the seat tube 15. A shaft section 50, parallel to the rear axle 36, is welded to the bracket 49, on the side of the bicycle 10 corresponding to the sprockets 41 and 42. An arm 51 has an end sleeve pivotally mounted on the shaft section 50 and a second end on which the wheel 45 is rotatively mounted, through ball bearing, on another shaft section 52 welded to the free end of the arm 51. Obviously, the teeth of the wheel 45 are meshed with the chain 43.

A torsion spring (not shown) engages both the bracket 49 and the arm 51 and produces a torsion force pushing the wheel 45 in direction 55 to thereby tension the chain 43.

A second wheel 46 is mounted on a shaft section 56 generally parallel to the rear axle 36 and having a first end welded to the outer surface of the head tube 13 on the side of the bicycle 10 corresponding to the sprockets 41 and 42. The wheel 46 is mounted on the shaft 56 through ball bearing (not shown) to reduce the friction. Of course, the teeth of the wheel 46 are meshed with the chain 43 to guide that chain.

A wheel 48 is mounted on the front of the prong of the fork 20 situated on the side corresponding to the sprockets 41 and 42 again through ball bearing (not shown). The wheel 48 directs the chain 43 along an appropriate course between the wheel 46 and the sprocket 41, in particular to allow the chain 43 to run through a U-shaped portion 58 of the fork 20.

Indeed, as illustrated in FIGS. 1-3 of the appended drawings, the front fork 20 is formed with this U-shaped portion 58 to allow the chain 43 to run from the wheel 46 to the wheel 48 and also from the sprocket 41 to the wheel 47.

The lower portion of the chain 43 is guided from the front sprocket 41 to the rear sprocket 42 by means of the pair of wheels 44 and 47.

Wheel 47 is mounted on a shaft section 59 generally parallel to the rear axle 36 and having a first end welded to a bracket itself welded to the outer surface of the head tube 13 and/or down tube 14 on the side of the bicycle corresponding to the sprockets 41 and 42. The wheel 47 is mounted on the shaft section 59 through ball bearing (not shown) to reduce the friction. Of course, the chain 43 is engaged on the peripherally toothed and/or grooved wheel 47.

The chain 43 is also engaged on the peripherally toothed and/or grooved wheel 44 rotatively mounted, through ball bearing, on the bottom bracket axle 30 between the crank 28 and the frame 11 of the two-wheel drive bicycle 10. The wheel 44 guides the chain 43 between the wheel 47 and the rear sprocket 42.

To protect the legs of the cyclist, a first chain guard, semicircular in cross section, is installed on the frame 11 to cover the chain 43 between the wheels 45 and 46, while a second chain guard 80, also semicircular in cross section, is mounted on the bicycle's frame 11 to conceal the chain between wheels 44 and 47.

As can be appreciated by one skilled in the art, the guided chain 43 constitutes a direct link between the front and rear sprockets 41 and 42. Power is therefore transmitted from the rear sprocket 42 to the front sprocket 41 directly through the chain 43. As the chain is guided by the toothed and/or grooved wheels 45-48 all rotating on ball bearings, low friction is involved. The front wheel driving mechanism comprises no cardan joint or other similar device that absorbs energy to thereby increase its efficiency.

Obviously, as the front wheel 22 is turned through the handlebars 23 and the fork 20, a torsion will be produced in the chain 43 between the wheels 46 and 48, and between the sprocket 41 and the wheel 47. A conventional bicycle chain is capable of accepting this torsion. However, more efficient and quiet operation is obtained through the use of a chain flexible both in the plane of the toothed and/or grooved wheels and sprockets and laterally of such plane. Chains of this type are presently available on the market.

Twisting of the chain 43 upon turning the front wheel 22 to steer the bicycle 10 will also require a small variation in the length of the chain loop 43 interconnecting the front 41 and rear 42 sprockets. It can be easily appreciated that the tension gear 45 provides for such length variation.

With the embodiment 10 of the two-wheel drive bicycle in accordance with the present invention, the chain 43 will continue to turn when the cyclist stops to operate the pedals 26 and 27. Another embodiment 60 of the two-wheel drive bicycle of the present invention will now be described in conjunction with FIGS. 4-6 of the appended drawings, in which the chain 43 driving the front wheel 22 stops running when rotation of the pedals 26 and 27 is interrupted to thereby prevent any skidding of the front 22 and rear 24 wheels during a turn.

The structure of the two-wheel drive bicycle 60 is generally the same as the embodiment 10, and accordingly it is believed unnecessary to describe it again. Only the alterations will be described and the corresponding pieces will be identified by the same reference numerals.

A first difference is that the down tube 61 and the chain stays such as 62 are generally aligned between the rear sprocket 42 and the front toothed and/or grooved wheels 46 and 47. Also note the oversize dimensions of the hollow down tube 61 to allow the chain 43 to ride inside that tube and thereby conceal that chain.

To enable the chain 43 to stop riding as rotation of the pedals 26 and 27 is interrupted, the rear sprocket 42 is mounted on the rear free wheel (not shown) of the bicycle 60, behind the sprocket cluster 33. For example, the innermost sprocket of the cluster 33 can be replaced by the rear sprocket 42.

The hub of the front wheel 22 of bicycle 60 is rotatively mounted on the front axle 40 through a conventional, well known free wheel (not shown). The front sprocket 41 is mounted on this front free wheel whereby the front sprocket 41, the chain 43 and the rear sprocket 42 stop running when rotation of the pedals 26 and 27 is interrupted. During a turn, the front wheel 22 will rotate at a speed higher than the rear wheel 24 due to its larger radius of curvature. The installation of the front 41 and rear 42 sprockets on the front and rear free wheels will prevent transmission of the additional rotational movement of the front wheel 22 to the rear wheel 24 to cause skidding of that rear wheel.

As can be appreciated from the appended drawings, the front sprocket 41, chain 43 and rear sprocket 42 of the bicycle 60 are located on the right side instead of the left side as in the case of bicycle 10. This is due to the installation of the front and rear sprockets 41 and 42 on the front and rear free wheels, respectively.

In the case of embodiment 60, the lower portion of the chain loop 43 extends straight between the rear sprocket 42 and the wheel 47. The spring mechanism 64 for lengthening and shortening the chain loop 43 when the fork 20 is turned to steer the bicycle 60 is mounted on the upper portion of the chain loop 43 extending between the rear sprocket 42 and the wheel 47. This mechanism 64 comprises a pair of toothed and/or grooved wheels 65 and 66 rotatively mounted at the two ends of a metallic bar 67 through ball bearings. This metallic bar 67 is itself pivotally mounted, through a central shaft section (not shown) on a bracket (not shown) welded to the upper face of the right chain stay 62. A torsion spring (not shown) mounted on the latter shaft section engages both the last mentioned bracket and the bar 67 to impart to this metallic bar 67 a torsional force in direction 71 whereby the toothed and/or grooved wheels 65 and 66, engaging the chain 43, tension adequately this chain. The torsion spring will also enable lengthening and shortening of the chain loop 43 as the fork 20 is turned while maintaining a correct tension in the chain.

It should also be noted that the chain guiding wheel 46 and pulley 47 are rotatively mounted, through ball bearings, on a single shaft portion 81 welded to a bracket 82 itself welded to the lower face of a down tube extension 83. As can be seen, the wheel 47 is mounted on the shaft 81 between the wheel 46 and the bracket 82. To prevent the two sections of chain 43 riding in opposite directions to rub each other, the diameter of wheel 46 is greater than the diameter of wheel 47 as shown in FIGS. 4–6.

As illustrated in FIG. 4, the tensioned section of the chain 43 between the front sprocket 41 and the wheel 65 is situated, when the bicycle 60 is run straightforwardly, in a transversal plane in which the axis of rotation of wheel 22 and the fork 84 in the head tube of the bicycle frame are also lying. One of ordinary skill in the art will appreciate that this contributes to reduce torque applied to the handlebar by the tension in the chain 43.

Figure 6:
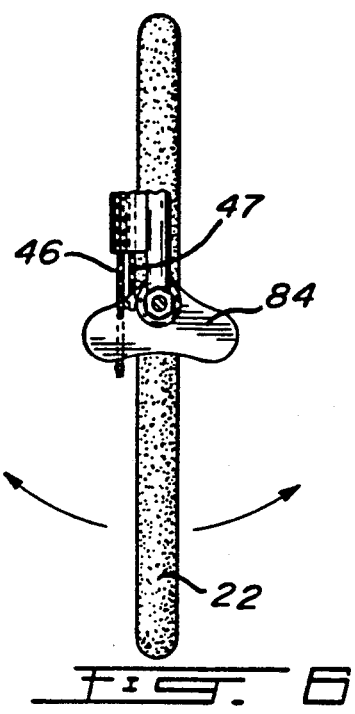
FIG. 6 is a top, cross sectional view of the front wheel and fork of the bicycle of FIG. 4, taken along line 6—6 of FIG. 5.
Figure 5:
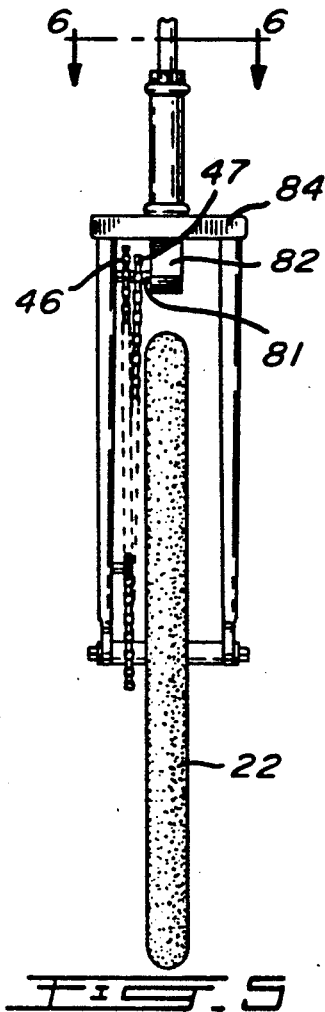
FIG. 5 is a front elevational view of the front wheel and fork of the two-wheel drive bicycle of FIG. 4.

In the embodiment 60 of FIGS. 4–6, the front fork 84 is designed to require no modification to allow passage of the chain 43.

The embodiments 10 and 60 of the bicycle in accordance with the invention presents, amongst others, the following advantages:

the driving power is transmitted directly from the rear to the front sprocket through a single chain 43 guided by toothed and/or grooved wheels, whereby friction is reduced to the minimum;

as soon as the pedals are operated, the front wheel is driven;

simple, light and low cost design;

improved reliability;

increased stability; the stability is not affected by the driving power;

the toothed and/or grooved wheels are not used to transmit driving power but only to guide the chain transmitting this power, these toothed and/or grooved wheel rotating on ball bearings (eventually needle bearings) for a minimal friction; and reduced dimensions and improved homogeneity of the fork 20, which includes no power transmission pieces;

etc.

The preferred embodiments of the present invention have been described in the foregoing description with reference to a foot powered bicycle. However, the same concept can obviously be applied to other types of cycles, in particular motorcycles.

Although the present invention has been described hereinabove by way of preferred embodiments thereof, these embodiments can be modified at will, within the scope of the appended claims, without departing from the spirit and nature of the present invention.

What is claimed is:

1. A multi-wheel drive cycle comprising:
  a frame;
  a front fork assembly mounted on said frame through a pivotal connection to steer said cycle;
  a front wheel mounted on said fork assembly to rotate about a first axis;
  a rear wheel mounted on said frame to rotate about a second axis;
  a mechanism for driving said rear wheel;
  a front sprocket mounted on said front wheel and centered on said first axis to drive said front wheel;
  a rear sprocket mounted on said rear wheel, centered on said second axis, and driven by said driving mechanism;
  a chain forming a closed loop and meshing with both said front and rear sprockets, said front and rear sprockets lying in at least one plane and said chain being flexible in said at least one plane and laterally of said at least one plane;
  means for guiding said chain between said front and rear sprockets, said chain guiding means comprising at least one rotating member engaging said chain and rotatively mounted on said cycle near said pivotal connection;
  whereby, in operation, said rear sprocket is driven by said mechanism, and said chain meshing with both said front and rear sprockets, causes said front sprocket to be driven through said chain.

2. A cycle according to claim 1, in which said chain guiding means comprises means for lengthening and shortening said chain loop as the front fork assembly is pivoted about said pivotal connection.

3. A cycle according to claim 2, wherein said lengthening and shortening means comprise a spring mechanism.

4. A cycle according to claim 1, in which said chain is twistable and said at least one rotating member comprises a plurality of rotating members rotatively mounted on a single axle fixed to said frame.

5. A cycle according to claim 1, in which said chain is twistable and said at least one rotating member comprises a plurality of rotating members rotatively mounted on respective, spaced apart axles fixed to said frame.

6. A cycle according to claim 1, wherein:
  said front wheel comprises a front hub rotating with said front wheel about the axis;
  said front wheel is mounted on said fork assembly through said front hub;
  said front sprocket is mounted on said front hub;
  said rear wheel comprises a rear hub rotating with said rear wheel about the second axis;
  said rear wheel is mounted on said frame through said rear hub; and
  said rear sprocket is mounted on said rear hub.

7. A cycle according to claim 1, wherein said at least one rotating member comprises a grooved pulley.

8. A cycle according to claim 1, wherein said at least one rotating member comprises a toothed wheel.

9. A multi-wheel drive cycle comprising:
  a frame;
  a front fork assembly mounted on said frame through a pivotal connection to pivot about a first axis and enable steering of the cycle;
  a front wheel mounted on said fork assembly to rotate about a second axis;
  a rear wheel mounted on said frame to rotate about a third axis;
  a mechanism for driving one of said front and rear wheels;

a front rotative wheel driving member mounted on the front wheel and centered on said second axis;
a rear rotative wheel driving member mounted on the rear wheel and centered on said third axis;
a closed loop wheel driving element interconnecting said front and rear wheel driving members for transmitting rotational movement from one of said front and rear rotative wheel driving members to the other of said front and rear rotative wheel driving members; and
means for guiding said closed loop element between said front and rear wheel driving members, said guiding means comprising a set of rotative deviating members engaging said closed loop element and rotatively mounted on said frame near said pivotal connection.

10. A cycle as recited in claim 9, in which said closed loop element comprises between said front wheel driving member and said rotative deviating members a tensioned section situated, when said cycle is run straightforwardly, in a transversal plane in which said first axis is lying.

* * * * *